US012597409B2

(12) United States Patent
Li et al.

(10) Patent No.: US 12,597,409 B2
(45) Date of Patent: Apr. 7, 2026

(54) SYSTEMS AND METHODS FOR INCREASING A RESONATOR QUALITY FACTOR

(71) Applicant: Toyota Motor Engineering & Manufacturing North America, Inc., Plano, TX (US)

(72) Inventors: Xiaopeng Li, Ann Arbor, MI (US); Taehwa Lee, Ann Arbor, MI (US); Ziqi Yu, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 280 days.

(21) Appl. No.: 18/312,228

(22) Filed: May 4, 2023

(65) Prior Publication Data

US 2024/0371350 A1 Nov. 7, 2024

(51) Int. Cl.
*G10K 11/172* (2006.01)

(52) U.S. Cl.
CPC .................................. *G10K 11/172* (2013.01)

(58) Field of Classification Search
CPC .... G10K 11/172; G10K 11/04; G10K 11/175; G01H 13/00; H10N 30/304; G01N 2291/0427
USPC ........... 181/208, 286; 381/353, 354; 216/39; 52/1
See application file for complete search history.

(56) References Cited

U.S. PATENT DOCUMENTS 4,467,235 A * 8/1984 De Wames ............. G01L 1/165 310/329
4,492,246 A 1/1985 Prescott et al.
4,736,701 A * 4/1988 Kondo ...................... B63B 3/70 114/340
5,499,526 A 3/1996 Muro
6,134,964 A 10/2000 Jaenker et al.
7,358,503 B2 4/2008 Fellerman et al.
7,551,058 B1 6/2009 Johnson et al.
(Continued)

FOREIGN PATENT DOCUMENTS

DE 4336112 A1 4/1995

OTHER PUBLICATIONS

Wu et al., "Asymmetric scattering of flexural waves in a parity-time symmetric metamaterial beam," The Journal of the Acoustical Society of America, vol. 146, 2019, pp. 850-862.
(Continued)

*Primary Examiner* — Forrest M Phillips
(74) *Attorney, Agent, or Firm* — Christopher G. Darrow; Darrow Mustafa PC

(57) ABSTRACT

System, methods, and other embodiments described herein relate to a high-Q resonant state embedded system in a continuous body. In one embodiment, a system includes a longitudinally extending body that is subject to a flexural wave. The longitudinally extending body is attached to a fixed structure at a first end. The system also includes a mechanical resonator coupled to a surface of the longitudinally extending body along a length dimension of the longitudinally extending body. The mechanical resonator is located at a distance away from a second end of the longitudinally extending body to exhibit an infinite Q factor based on physical properties of the mechanical resonator.

20 Claims, 6 Drawing Sheets

(56) References Cited

U.S. PATENT DOCUMENTS

| | | | | |
|---|---|---|---|---|
| 8,228,141 | B2 * | 7/2012 | Abdolvand | H03H 9/2405 333/186 |
| 9,411,029 | B2 | 8/2016 | Pirkl | |
| 9,466,283 | B2 | 10/2016 | Yang et al. | |
| 9,631,692 | B2 * | 4/2017 | Carcaterra | F16F 7/10 |
| 9,933,503 | B2 | 4/2018 | Vernickel et al. | |
| 10,284,176 | B1 | 5/2019 | Solal | |
| 10,717,672 | B2 | 7/2020 | Loh et al. | |
| 10,724,994 | B2 | 7/2020 | Van Tooren et al. | |
| 11,022,561 | B2 | 6/2021 | Ziehl | |
| 11,512,756 | B1 * | 11/2022 | Sterling | F16F 7/10 |
| 11,688,379 | B2 * | 6/2023 | Lee | G10K 11/175 181/286 |
| 2006/0169557 | A1 * | 8/2006 | Goetchius | F16F 7/104 188/378 |
| 2015/0338380 | A1 | 11/2015 | Ziehl et al. | |
| 2017/0115382 | A1 | 4/2017 | Koudar et al. | |
| 2018/0107015 | A1 | 4/2018 | Dümpelmann et al. | |
| 2021/0126615 | A1 * | 4/2021 | Yoon | H03H 9/02259 |
| 2022/0051650 | A1 | 2/2022 | Lee et al. | |
| 2022/0190231 | A1 | 6/2022 | Li et al. | |
| 2022/0214312 | A1 | 7/2022 | Lee et al. | |
| 2022/0285604 | A1 | 9/2022 | Li et al. | |

OTHER PUBLICATIONS

Schipf et al., "Tunable piezoelectric metamaterial for Lamb waves using periodic shunted circuits," arXiv:2207.07845v1, Jul. 16, 2022, pp. 1-30.
Zhao et al., "Numerical analysis of effective refractive index ultrasonic sensor based on Cantilever arm structure slot-based dual-micro-ring resonator," International Journal of Modern Physics B, vol. 35, No. 4, 2021, pp. 1-15.
Durdaut et al., "Phase Sensitivity and Phase Noise of Cantilever-Type Magnetoelastic Sensors Based on the ΔE Effect," arXiv:2003.01085v1, Mar. 2, 2020, pp. 1-15.
Casadei et al., "Piezoelectric resonator arrays for tunable acoustic waveguides and metamaterials," Journal of Applied Physics, vol. 112, 2012, pp. 1-6.
Casadei et al., "Broadband vibration control through periodic arrays of resonant shunts: experimental investigation on plates," Smart Materials and Structures, vol. 19, No. 1, 2010, pp. 1-13.
Cardella et al., "Manipulating waves by distilling frequencies: a tunable shunt-enabled rainbow trap," Smart Materials and Structures, vol. 25, 2016, pp. 1-15.
Jain et al., "Emerging Ideas in Nanocantilever based Biological Sensors," arXiv:1305.5729, 2013, pp. 1-17.
Airoldi et al., "Design of tunable acoustic metamaterials through periodic arrays of resonant shunted piezos," New Journal of Physics, vol. 13, Nov. 2011, pp. 1-21.
Chen et al., "Exceptional points enhance sensing in an optical microcavity," Nature, vol. 548, 2017, pp. 192-196.
Su et al., "Research on damage visualization of concrete structures based on electrical resistance tomography," Frontiers in Physics, 2022, pp. 1-12.
Ashida et al., "Non-Hermitian physics," Advances in Physics 69 (3) (2020), pp. 249-435.
Guo et al., "Observation of PT-symmetry breaking in complex optical potentials," Physical review letters, vol. 103, Iss. 9, 2009, 4 pages.
Lee et al., "Topolectrical circuits," Communications Physics 1 (1), 2018, pp. 1-9.
Yoshida et al., "Exceptional rings protected by emergent symmetry for mechanical systems," Physical Review B, vol. 100, Iss. 5, 2019, pp. 1-17.
Fleury et al., "An invisible acoustic sensor based on parity-time symmetry," Nature communications 6 (1), 2015, pp. 1-7.
Zangeneh-Nejad et al., "Active times for acoustic metamaterials," Reviews in Physics, vol. 4, Nov. 2019, pp. 1-17.
Ding et al., "Emergence, coalescence, and topological properties of multiple exceptional points and their experimental realization," Physical Review X, vol. 6, Iss. 2, 2016, 13 pages.
Gear et al., "Unidirectional zero reflection as gauged parity-time symmetry," New Journal of Physics, vol. 19, Iss. 12, 2017, pp. 1-10.
Lin et al., "Unidirectional invisibility induced by PT-symmetric periodic structures," Physical Review Letters, vol. 106, Iss. 21, 2011, pp. 1-4.
Li et al., "Experimental demonstration of extremely asymmetric flexural wave absorption at the exceptional point," Extreme Mechanics Letters, vol. 52, Apr. 2022, pp.
Wang et al., "Extremely asymmetrical acoustic metasurface mirror at the exceptional point," Physical review letters, vol. 123, Iss. 21, Nov. 2019, pp. 1-5.
Hodaei et al., "Enhanced sensitivity at higher-order exceptional points," Nature, vol. 548 (7666), Aug. 2017, pp. 187-191.
Assawaworrarit et al., "Robust wireless power transfer using a nonlinear parity-time-symmetric circuit," Nature, vol. 546 (7658), Jun. 2017, pp. 387-390.
Peng et al., "Parity-time-symmetric whispering-gallery microcavities," Nature Physics, vol. 10, Iss. 5, May 2014, pp. 394-398.
Yi et al., "Asymmetric viscoelastic metamaterials for broad bandgap design and unidirectional zero reflection," Mechanical Systems and Signal Processing, vol. 162, Jan. 2022, pp.
Wang et al., "Coherent perfect absorption at an exceptional point," Science, vol. 373, Iss. 6560, Sep. 2021, pp. 1261-1265.
Sweeney et al., "Perfectly absorbing exceptional points and chiral absorbers," Physical review letters, vol. 122, Iss. 9, Mar. 2019, pp. 1-6.
Zhu et al., "Simultaneous observation of a topological edge state and exceptional point in an open and non-Hermitian acoustic system," Physical review letters, vol. 121, Iss. 12, Sep. 2018, pp. 1-14.
Liu et al., Willis metamaterial on a structured beam, Physical Review X, vol. 9, Iss. 1, 2019, pp. 1-21.
Domínguez-Rocha et al., "Environmentally induced exceptional points in elastodynamics," Physical Review Applied 13 (1), 2020, pp. 1-8.
Cummer et al., "Controlling sound with acoustic metamaterials," Nature Reviews Materials, vol. 1, Iss. 3, Mar. 2016, pp. 1-13.
Chen et al., "A review of tunable acoustic metamaterials," Applied Sciences, vol. 8, Iss. 9, 2018, pp. 1-21.
Ji et al., "Recent progress in acoustic metamaterials and active piezoelectric acoustic metamaterials—a review," Applied Materials Today, vol. 26, Mar. 2022, pp. 1-28.
Popa et al., "Non-reciprocal and highly nonlinear active acoustic metamaterials," Nature communications, vol. 5, Iss. 1, 2014, pp. 1-5.
Popa et al., "Active acoustic metamaterials reconfigurable in real time," Physical Review B, vol. 91, Iss. 22, 2015, pp. 1-7.
Akl et al., "Analysis and experimental demonstration of an active acoustic metamaterial cell," Journal of Applied Physics, vol. 111, Iss. 4, 2012, pp.
Chen et al., "An active mechanical willis meta-layer with asymmetric polarizabilities," Nature communications, vol. 11 Iss. 1, 2020, pp. 1-8.
Li et al., "Shaping elastic wave mode conversion with a piezoelectric-based programmable meta-boundary," Extreme Mechanics Letters, vol. 39, Sep. 2020, pp. 1-18.
Li et al., "An active meta-layer for optimal flexural wave absorption and cloaking," Mechanical Systems and Signal Processing, vol. 149, Feb. 2021, pp. 1-35.
Chen et al., "Realization of active metamaterials with odd micropolar elasticity," Nature communications, vol. 12, Iss. 1, 2021, pp. 1-12.
Li et al., "Acoustic metamaterials capable of both sound insulation and energy harvesting," Smart Materials and Structures, vol. 25, No. 4, 2016, pp. 1-5.
Airoldi et al., "Design of tunable acoustic metamaterials through periodic arrays of resonant shunted piezos," New Journal of Physics, vol. 13, Iss. 11, Nov. 2011, pp. 1-21.
Thomes et al., "Space-time wave localization in electromechanical metamaterial beams with programmable defects," Mechanical Systems and Signal Processing, vol. 167, Part B, Mar. 2022, pp. 1-16.

(56) References Cited

OTHER PUBLICATIONS

Trainiti et al., "Time-periodic stiffness modulation in elastic metamaterials for selective wave filtering: theory and experiment," Physical review letters, vol. 122, Iss. 12, Mar. 2019, 17 pages.
Chen et al., "Enhanced flexural wave sensing by adaptive gradient-index metamaterials," Scientific reports, vol. 6, Iss. 1, 2016, pp. 1-11.
Zhu et al., "Experimental study of an adaptive elastic metamaterial controlled by electric circuits," Applied Physics Letters, vol. 108, Iss. 1, 2016, 6 pages.
Hu et al., "Metamaterial beam with graded local resonators for broadband vibration suppression," Mechanical Systems and Signal Processing, vol. 146, Jan. 2021, pp.
Yi et al., "Programmable metamaterials with digital synthetic impedance circuits for vibration control," Smart Materials and Structures, vol. 29, No. 3, 2020, pp. 1-21.
Sugino et al., "Digitally programmable resonant elastic metamaterials," Physical Review Applied, vol. 13, Iss. 6, 2020, pp.
Wang et al., "Multi-resonant piezoelectric shunting induced by digital controllers for subwavelength elastic wave attenuation in smart metamaterial," Smart Materials and Structures, vol. 26, No. 2, 2017, pp. 1-20.
Li et al., "A self-adaptive metamaterial beam with digitally controlled resonators for subwavelength broadband flexural wave attenuation," Smart Materials and Structures, vol. 27, No. 4, 2018, pp. 1-13.
Gripp et al., "Vibration and noise control using shunted piezoelectric transducers: A review," Mechanical Systems and Signal Processing, vol. 112, Nov. 2018, pp. 359-383.
Chen et al., "Elastic-electro-mechanical modeling and analysis of piezoelectric metamaterial plate with a self powered synchronized charge extraction circuit for vibration energy harvesting," Mechanical Systems and Signal Processing vol. 143, Sep. 2020, pp. 1-27.
Nassar et al., "Nonreciprocity in acoustic and elastic materials," Nature Reviews Materials, vol. 5, Iss. 9, 2020, pp. 667-685.
Sugino et al., "Nonreciprocal piezoelectric metamaterial framework and circuit strategies," Physical Review B 102 (1), 2020, 7 pages.
Wu et al., "Asymmetric scattering of flexural waves in a parity-time symmetric metamaterial beam," The Journal of the Acoustical Society of America, vol. 146, Iss. 1, 2019, pp. 850-862.
Doppler et al., "Dynamically encircling an exceptional points in a waveguide: asymmetric mode switching from the breakdown of adiabaticity," Nature, vol. 537, 2016, pp. 76-79.
Zhang et al., "Dynamically encircling exceptional points: in situ control of encircling loops and the role of the starting point," Physical Review X, vol. 8, Iss. 2, Apr. 2018, pp. 1-18.
A. Preumont et al., "Vibration control of active structures: an introduction," 3rd edition, vol. 246, Springer, 2018, 202 pages.
Tang et al., "Active-passive hybrid piezoelectric networks for vibration control: comparisons and improvement," Smart Materials and Structures, vol. 10, No. 4, 2001, pp. 794-806.
Neubauer et al., "Vibration damping with shunted piezoceramics: fundamentals and technical applications," Mechanical Systems and Signal Processing, vol. 36, Iss. 1, 2013, pp. 36-52.
Haus et al., "Waves and fields in optoelectronics," Prentice-Hall, Inc., Englewood Cliffs, NJ, 1984, 402, pp.
Fan et al., "Temporal coupled-mode theory for the Fano resonance in optical resonators," JOSA A, vol. 20, Iss. 3, 2003, pp. 569-572.
Zhang et al., "A metamaterial beam with inverse nonlinearity for broadband micro-vibration attenuation," Mechanical Systems and Signal Processing, vol. 159, Oct. 2021, pp. 1-13.
Allik et al., "Finite element method for piezoelectric vibration," International journal for numerical methods in engineering, vol. 2, Iss. 2, 1970, pp. 151-157.
Li et al. "Observation of an exceptional point with an LR-shunted resonator." Mechanical Systems and Signal Processing 196 (2023): 110297.
Li et al. "Experimental study of a tunable perfect flexural wave absorber with a piezoelectric shunted resonator." Frontiers in Physics 10 (2022): 1306.
Leng et al. "Limits of flexural wave absorption by open lossy resonators: reflection and transmission problems." New Journal of Physics 21.5 (2019): 053003.
Hsu et al. "Bound states in the continuum." Nature Reviews Materials 1.9 (2016): 1-13.
U.S. Appl. No. 18/133,135, filed Apr. 11, 2023.
U.S. Appl. No. 18/133,076, filed Apr. 11, 2023.

* cited by examiner

SYSTEMS AND METHODS FOR INCREASING A RESONATOR QUALITY FACTOR

TECHNICAL FIELD

The subject matter described herein relates, in general, to a resonator structure and, more particularly, to a single resonator embedded state system that achieves an unbounded quality factor (Q factor) in a continuum elasticity.

BACKGROUND

Resonators are used in a variety of industries and for a variety of purposes. For example, resonators may be used for sensing frequencies and manipulating signals, among other uses. As another example, some mechanical structures are intended to support lateral loads. Such beams are susceptible to external forces. In doing so, the displacement is predominantly transverse to the centerline and internal shear forces and bending moments are generated. This dynamic behavior of beams is called flexural motion in the form of flexural waves.

As such, external forces on a body cause a flexural wave to propagate through the body. Bending or flexural waves propagating through a structure may damage the structure or generate unwanted noise in the surrounding environment. High strength-to-mass materials such as aluminum that are included in structures, such as vehicles, to reduce the weight of the vehicle are particularly susceptible to flexural wave transmission. Resonators may be used to absorb or reflect the flexural waves that propagate through these structures. However, the material and physical properties of a mechanical resonator negatively impact the ability of the resonator to fully absorb or reflect the flexural waves.

In another example, a resonator may be part of a sensing system. Flexural waves that propagate through a body are altered by the material and physical properties of the body. For example, if a crack develops on the body, or the temperature or mass of the body changes, the flexural wave that propagates through the body will also change. In this example, resonators may be placed on the body to determine the environmental changes. In this example, a downstream system relies on the resonator output to identify an environmental change and to execute an operation based on a detected change. A local resonator that is embedded in a continuum beam exhibits wave leakage, which results in a limited quality factor (Q factor) for the resonator.

SUMMARY

In one embodiment, example systems and methods relate to forming a local resonator on a semi-infinite beam to produce an embedded state system with an unbounded Q factor and limited radiation.

In one embodiment, an embedded state system is disclosed. The embedded state system includes a longitudinally extending body that is subject to a flexural wave. The longitudinally extending body is attached to a fixed structure at a first end. The embedded state system also includes a mechanical resonator coupled to a surface of the longitudinally extending body along a length dimension of the longitudinally extending body. The mechanical resonator is located at a distance away from a second end of the longitudinally extending body to exhibit an infinite Q factor based on the physical properties of the mechanical resonator.

In one embodiment, an embedded state system includes a longitudinally extending body that is subject to a flexural wave. The longitudinally extending body is attached to a fixed structure at a first end. The embedded state system also includes a mechanical resonator, having a rigid mass component, coupled to a surface of the longitudinally extending body along a length dimension of the longitudinally extending body. The mechanical resonator is located at a distance away from a second end of the longitudinally extending body to exhibit an infinite Q factor based on the mass of the rigid mass component.

In one embodiment, a method for forming an embedded state system with an unbounded Q factor is disclosed. In one embodiment, the method includes identifying physical properties of a mechanical resonator to be positioned along a length dimension of a longitudinally extending body that is subject to a flexural wave. The method also includes identifying, based on the physical properties of the mechanical resonator, a location along the longitudinally extending body at which the mechanical resonator is to be affixed to achieve an infinite Q factor. The method further includes coupling the mechanical resonator to the longitudinally extending body at the identified location.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
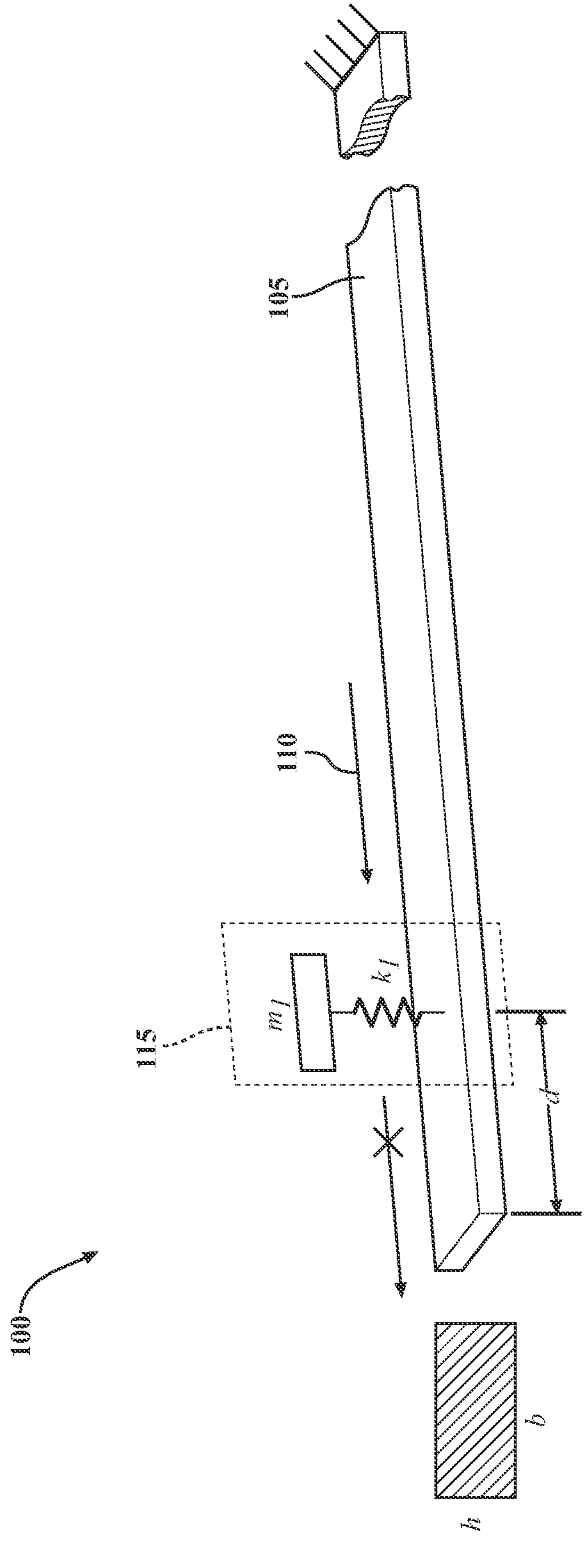
FIG. 1 illustrates one embodiment of an embedded state system with an unbound Q factor.

Systems, methods, and other embodiments associated with improving the absorption-factor of a mechanical resonator in a body are disclosed herein. Mechanical resonators are used in a variety of applications in a variety of fields. For example, mechanical resonators can be mounted to structural bodies to detect environmental changes associated with the body. Some mechanical structures are intended to support lateral loads. These lateral loads generate flexural waves that propagate through the structure. The physical properties of the structure alter the properties of the flexural wave. For example, a crack in the structure, or a change in temperature or mass of the structure, changes the properties, such as the wavelength, of the flexural waves that propagate therethrough. As such, a resonator that detects flexural waves can detect a change to the structure of the body based on a change to the flexural wave that is received at the resonator.

As another example, bending or flexural waves propagating through a structure may damage the structure or generate unwanted noise in the surrounding environment. Resonators may absorb or reflect the flexural waves that propagate through these structures to prevent damage and unwanted noise. In another example, a mechanical resonator is used in a micro-electromechanical system (MEMS) for timing references, signal filtering, mass sensing, biological sensing, motion sensing, or for a number of other purposes. Perfect flexural wave absorption systems may be useful in any of the aforementioned applications and many others to absorb a flexural wave propagating through a body.

However, the material and physical properties of a mechanical resonator negatively impact the ability of the mechanical resonator to fully absorb or reflect a flexural wave. Resonator performance is defined by a quality factor, or Q factor, which is a ratio of the initial energy stored in the mechanical resonator to the energy lost in one radian of the oscillation cycle. The Q factor describes the damping of the mechanical resonator and indicates the resonator bandwidth relative to a peak frequency. A higher Q factor corresponds to a narrow bandwidth, which is desirable in many applications. The Q factor of the mechanical resonator is affected by an intrinsic damping of the resonator as well as the leakage damping due to the interaction with its support, known as the anchor loss.

When using a mechanical resonator, at least a portion of the energy of a flexural wave propagates past the mechanical resonator such that the resonator behaves as a damped resonator. As such, the Q factor of a mechanical resonator is limited by the properties of the mechanical resonator itself. Accordingly, the present specification describes a flexural wave embedded state system that achieves an infinite Q factor despite the inherent limitations of the mechanical resonator. This is achieved by tuning the distance of a mechanical resonator from a free-end boundary (or another type of boundary) based on the material and physical properties of the mechanical resonator and the material and physical properties of the body on which the mechanical resonator is disposed. As such, the embedded state system includes a mechanical resonator disposed on the body at a particular distance from a free end of the body so as to exhibit an infinite Q factor.

Specifically, the present embedded state system includes a mechanical resonator that is placed at a distance, d, away from an end of an infinitely long beam having a cross-section b×h. By tuning the distance, d, the present embedded state system operates in an embedded state with minimum radiation and an infinite Q factor. As such, the embedded state system of the present specification reflects flexural waves that may propagate through a body.

The present embedded state system operates in a bound state in the continuum (BIC), with a non-radiating eigenstate resulting in an efficient wave filter. As one particular example, the sensor may be mounted on a system and may monitor system performance. In this case, the embedded state system is a sensing structure to monitor system health by filtering out specific frequencies and testing the system with a wave at a particular frequency. In this case, the absorption sensor eliminates noise from other frequencies.

Due to the non-radiating feature, the embedded state system provides an unbounded Q factor. As specific examples, the embedded state system of the present specification may be used in wave processing, signal processing, and other sensing devices, as the embedded state system provides an infinite Q factor. Such embedded state systems may also be MEMS resonators for timing references, signal filtering, mass sensing, biological sensing, motion sensing, or various applications.

As used in the present specification and the appended claims, "embedded state" refers to an eigenmode that does not radiate energy to the surroundings. Further, the term "eigenstate" refers to an eigenvector or eigenmode of a system with the associated eigenvalue.

FIG. 1 illustrates one embodiment of an embedded state system 100 with an unbound Q factor. The embedded state system 100 includes a longitudinally extending body 105, such as a semi-infinite beam as depicted in FIG. 1. While FIG. 1 depicts the body 105 as having a particular structure, the body 105 may have any number of different forms, including a plate, a pipe, or another structure that is subject to flexural waves. The body 105 may be an elastic material, such as silicon, aluminum, or other thin metallic material. In one example, the body 105 has a first end attached to a fixed structure, as depicted in FIG. 1. The second end, by comparison, may have a variety of boundary conditions. For example, the second end may be a free end, as depicted in FIG. 1. However, it should be understood that this is just one example to explain the principles of the embedded state system 100. In other examples, the body 105 may have other boundary conditions at the second end, including a fixed-end configuration or a simply-supported end configuration.

As described above, the body 105 is subject to a lateral load that may be applied at any position along a length dimension of the body 105. The lateral load may be any force capable of generating the flexural wave 110 in the body 105. In one specific example, the force may be caused by sound waves acting upon the body 105. If left unaddressed, flexural waves could propagate through the body 105 and damage the body 105, generate acoustic noise in the structure to which the body 105 is attached, and/or obfuscate a target signal at a sensor system of which the body 105 is a component. Accordingly, the embedded state system 100 of the present specification absorbs the flexural wave to 1) prevent any damage or other undesirable side effect where the flexural wave 110 is allowed to propagate and/or 2) reduce the noise in a signal provided to a sensing system.

The embedded state system 100 includes a mechanical resonator 115 coupled to a surface of the longitudinally extending body 105. The mechanical resonator 115 is coupled to the body 105 using any one of a number of attachment means, including adhesives press form fittings, screw-type fittings, fasteners, clamps, or any other mechanism for joining one or more separate pieces together.

The mechanical resonator 115 is located at a distance, d, away from a second end of the longitudinally extending body 105 to exhibit an infinite Q factor. That is, as described above, the mechanical resonator 115 has an inherent damping that limits the Q factor of any associated resonant system. The mechanical resonator 115 of the present embedded state system 100 is specifically positioned at a location of the body 105 where the Q factor is unbound despite the inherent dampening by the mechanical resonator 115.

The distance, d, where the mechanical resonator 115 is positioned is based on the material and physical properties of the mechanical resonator 115 and the physical and material properties of the body 105 to which the mechanical resonator 115 is attached. For example, the mechanical resonator 115 may include a rigid mass component, as depicted in FIGS. 1-4 or may include a channel in a surface of the body 105 as depicted in FIGS. 5-8. The position along the longitudinally extending body 105 where the mechanical resonator 115 should be mounted depends on the type and form of the mechanical resonator. Specifically, when the mechanical resonator 115 includes a rigid mass component, the position of the mechanical resonator 115 on the body 105 may be based on the mass of the rigid mass component. By comparison, when the mechanical resonator 115 includes a surface channel of the body 105, the position of the mechanical resonator 115 on the body may be based on the properties of the channel.

In one particular example, given a mass-spring type mechanical resonator 115 with $m_1=9.5903\times10^{-4}$ kilograms (kg) and $k_1=9.1431\times10^{4}$ Newtons per meter (N/m) and an aluminum body 105 having a cross-sectional area of 12.7 millimeters (mm)×3.127 mm, a Young's Modulus of 70 gigaPascal (Gpa), a density of 2700 kg/$m^3$, and Poisson's ratio of 0.33, the calculated distance, d, is between 21 and 22 millimeters (mm) away from a free end of the longitudinally extending body. Note that different distances, d, may be calculated for the different types of mechanical resonators (as depicted in FIGS. 2-10) and for different boundary conditions of the body 105.

The mechanical resonator 115 itself may take a variety of forms. In one example, the mechanical resonator 115 includes a rigid mass component and a connecting element connected to the rigid mass component. The connecting element maintains the rigid mass component at an elevated distance from the longitudinally extending body 105 when the resonator 115 is in a rest position. In the example depicted in FIG. 1, the connecting element of the mechanical resonator 115 is a spring. The spring exerts a force to maintain the mass element $m_1$ at an elevated position away from the body 105 when the embedded state system 100 is at rest. While particular reference is made to particular resonator configurations, the mechanical resonator 115 may take other forms, such as those depicted in FIGS. 2-8.

Figure 10:
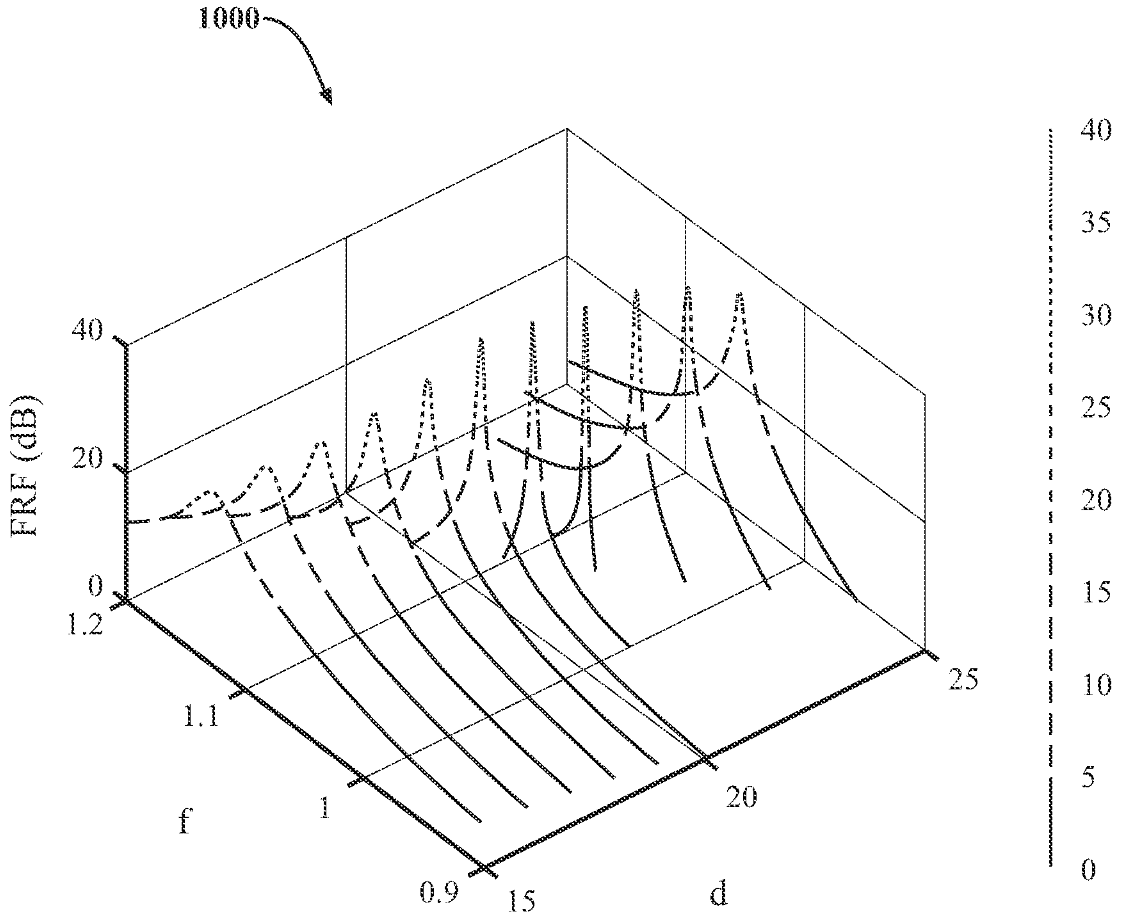
FIG. 10 illustrates an example graph of a resonator frequency response functions of an embedded state system.

As depicted in FIG. 10, simulation results indicate that when the distance, d, of the mechanical resonator 115 away from a second end of the body 105 is calculated as described herein, i.e., based on material and physical properties of the mechanical resonator 115 and the body 105, the embedded state system 100 has a higher Q factor than when the mechanical resonator is otherwise positioned on the body 105. Thus, the embedded state system 100 of the present specification addresses flexural waves via a single mechanical resonator 115 and reduces the radiation leakage with a high Q factor that is defined based on the distance of the mechanical resonator 115 from a free, fixed, or simply supported second end of the longitudinally extending body.

Figure 2:
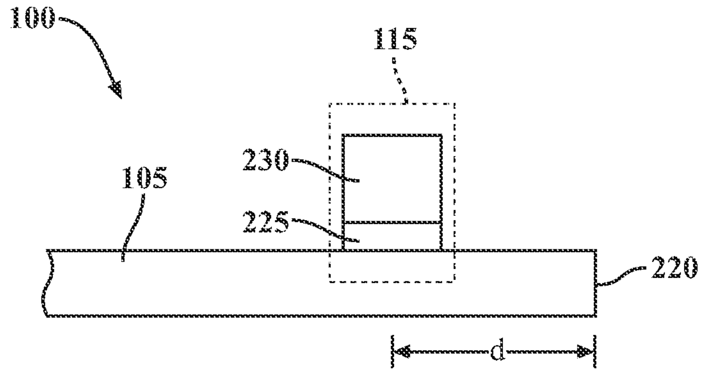
FIG. 2 illustrates one embodiment of an embedded state system with a soft base type mechanical resonator.

FIG. 2 illustrates one embodiment of an embedded state system 100 that includes a soft base type mechanical resonator 115. As described above, the mechanical resonator 115 may take one of a variety of forms. In one example, the mechanical resonator 115 includes a rigid mass component 230 and a connecting element connected to the rigid mass component 230. The connecting element maintains the rigid mass component 230 at an elevated distance away from the longitudinally extending body 105 when the embedded state system 100 is in a rest position. In the example depicted in FIG. 2, the connecting element is a soft base component 225. Specifically, the soft base component 225 is formed of a material that is less rigid, or softer, than the rigid mass component 230. The soft base component 225 may be a flexible rubber or plastic component with an axial stiffness that can be easily customized based on the specific material selection.

As described above, the mechanical resonator 115 may be placed a distance, d, away from a second end 220, which second end 220 is opposite the semi-infinite structure first end, such that the embedded state system 100 exhibits an infinite Q factor. This distance is calculated based on the physical and material properties of the rigid mass component 230, the soft base component 225, and the physical and material properties of the body 105. While FIGS. 2-10 depict a free-end boundary condition for simplicity and clarity, the second end 220 may have any of a variety of boundary conditions, including a fixed end and a simply supported end.

Figure 3:
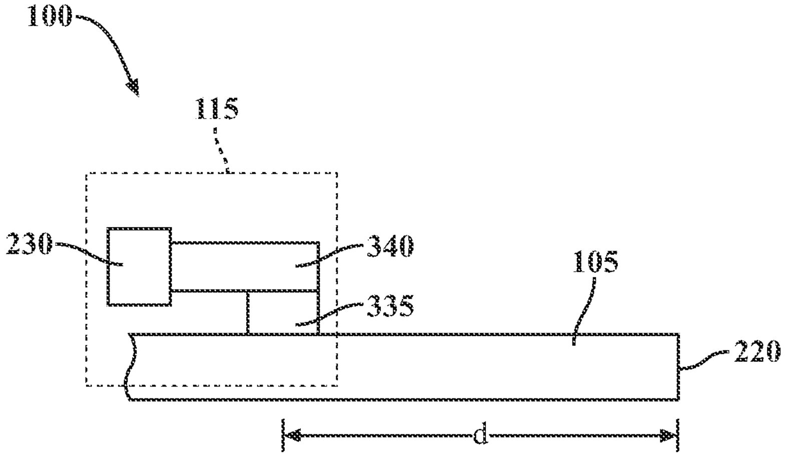
FIG. 3 illustrates one embodiment of an embedded state system with an arm-type mechanical resonator.

FIG. 3 illustrates one embodiment of an embedded state system 100 that includes an arm-type mechanical resonator 115. In this example, the connecting member that elevates a respective rigid mass component 230 includes a rigid base component 335 and an arm 340. The arm 340 extends at an angle from the rigid base component 335 and provides a customized bending stiffness. The arm 340 may be angled with respect to the rigid base component 335 (shown in FIG. 3 at an angle of 90 degrees with respect to the rigid base component 335 and parallel to the body 105). The arm 340 is configured to move up and down in an angular direction/movement with respect to the rigid base component 335.

The arm 340 and/or the rigid base component 335 are made of a thin metal, rubber, or plastic material. In an example, the arm 340 and rigid base component 335 form a single structural component that couples the rigid mass component 230 to the body 105. In another example, the rigid base component 335 and the arm 340 are different components, potentially made of different materials. If different materials, the rigid base component 335 may be secured to both the longitudinally extending body 105 and the arm 340, which has an opposite end that is secured to the rigid mass component 230 configured for maintaining the rigid mass component 230 at an elevated distance from the upper major surface of the longitudinally extending body 105.

The rigid base component/arm configuration of the mechanical resonator 115 may also take one of a variety of forms. For example, as depicted in FIG. 3, the arm 340 of the mechanical resonator 115 may extend from the rigid base component 335, towards the fixed structure at the first end of the longitudinally extending body 105, and away from the second end 220 of the longitudinally extending body 105. With the coordinate system depicted in FIG. 3, the arm 340 of the mechanical resonator 115 extends to the left.

As described above, the mechanical resonator 115 may be placed a distance, d, away from a second end 220, which second end 220 is opposite the semi-infinite structure first end, such that the embedded state system 100 exhibits an infinite Q factor. This distance is calculated based on the physical and material properties of the rigid mass component 230, the arm 340, the rigid base component 335, as well as the physical and material properties of the body 105.

Figure 4:
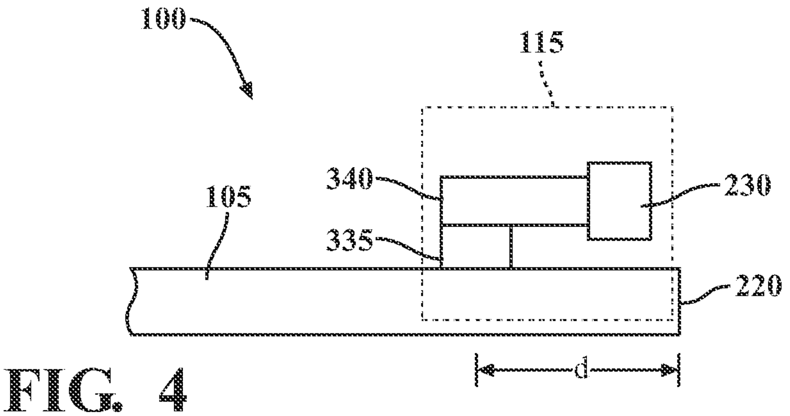
FIG. 4 illustrates another embodiment of an embedded state system with an arm-type mechanical resonator.

In another example depicted in FIG. 4, the arm 340 of the mechanical resonator 115 may extend away from the rigid base component 335, away from the fixed structure at the first end of the longitudinally extending body 105, and towards the second end 220 of the longitudinally extending body 105. With the coordinate system depicted in FIG. 4, the arm 340 of the mechanical resonator 115 extends to the right.

Figure 5:
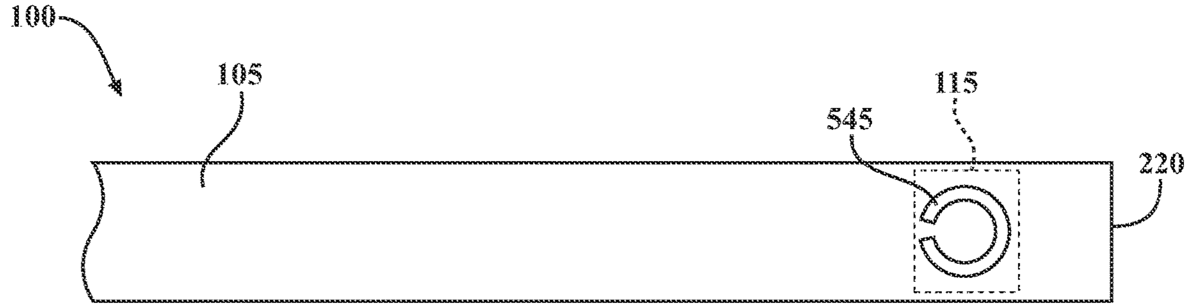
FIG. 5 illustrates one embodiment of an embedded state system with a channel-type mechanical resonator.

FIG. 5 illustrates one embodiment of an embedded state system 100 that includes a channel-type mechanical resonator 115. In this example, the mechanical resonator 115 includes a channel 545 in a surface of the longitudinally extending body 105. Such a channel 545 may be formed in any of a number of ways, including laser machining, computer numerical control (CNC) machining, or etching, to name a few. The channel 545 changes the physical properties of the body 105 at that location, and thus this region of the body has a different response to a propagating flexural wave. As such, the channel 545 properties, i.e., shape, width, and depth among others, may be selected such that the embedded state system 100 achieves an unbound Q factor.

Figure 6:
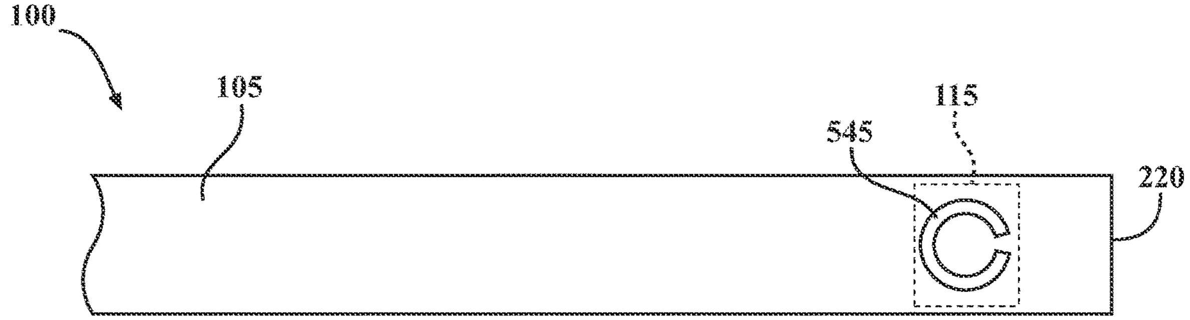
FIG. 6 illustrates another embodiment of an embedded state system that includes a channel-type mechanical resonator.

As depicted in FIGS. 5-8, the form of the channel 545 may vary. Specifically, as depicted in FIG. 5, the channel 545 may be C-shaped with the opening in the C-shape, functioning as a spring, facing the fixed structure at the first end of the longitudinally extending body 105 and facing away from the second end 220 of the longitudinally extending body 105. By contrast and as depicted in FIG. 6, the opening of the C-shaped channel 545 may face away from the fixed structure at the first end of the longitudinally extending body 105 and towards the second end 220 of the longitudinally extending body 105.

Figure 7:
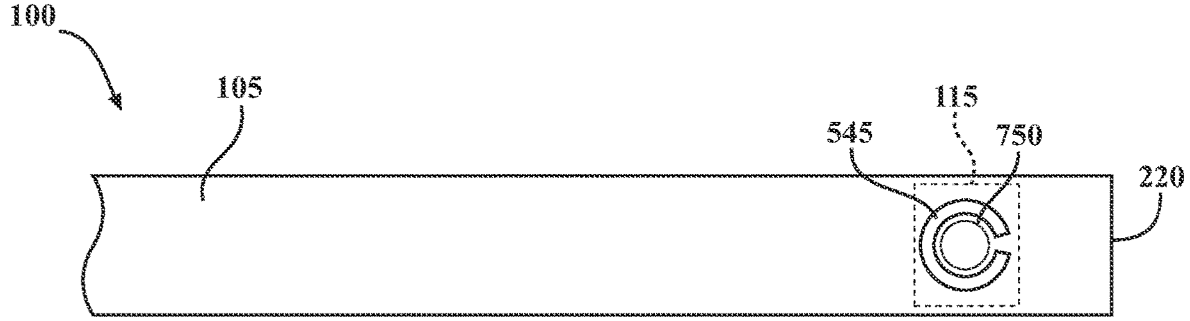
FIG. 7 illustrates another embodiment of an embedded state system that includes a channel-type mechanical resonator with an attached mass.

In one example depicted in FIG. 7, the mechanical resonator 115 may include additional absorbing elements. For example, a rigid mass component 750 may be disposed within the C-shaped channel 545. In this example, the rigid mass component 750 and the C-shaped channel 545 operate to block/absorb flexural waves that propagate through the body 105.

Figure 8:
FIG. 8 illustrates another embodiment of an embedded state system that includes a channel-type mechanical resonator.

Another configuration is depicted in FIG. 8 where the channel 545 comprises parallel slots in the body surface. The slots are perpendicular to the length dimension of the longitudinally extending body 105. As with the examples depicted in FIGS. 2-4, the exact distance, d, between the second end 220 of the mechanical resonator 115 and the mechanical resonator 115 depends on the particular resistor configuration and is set such that the absorption spectrum of the embedded state system 100 exhibits an unbound/infinite Q factor. In this example, the distance, d, is calculated based on the properties of the channels 545, and any rigid mass component 750, as well as the physical and material properties of the body 105.

Figure 9:
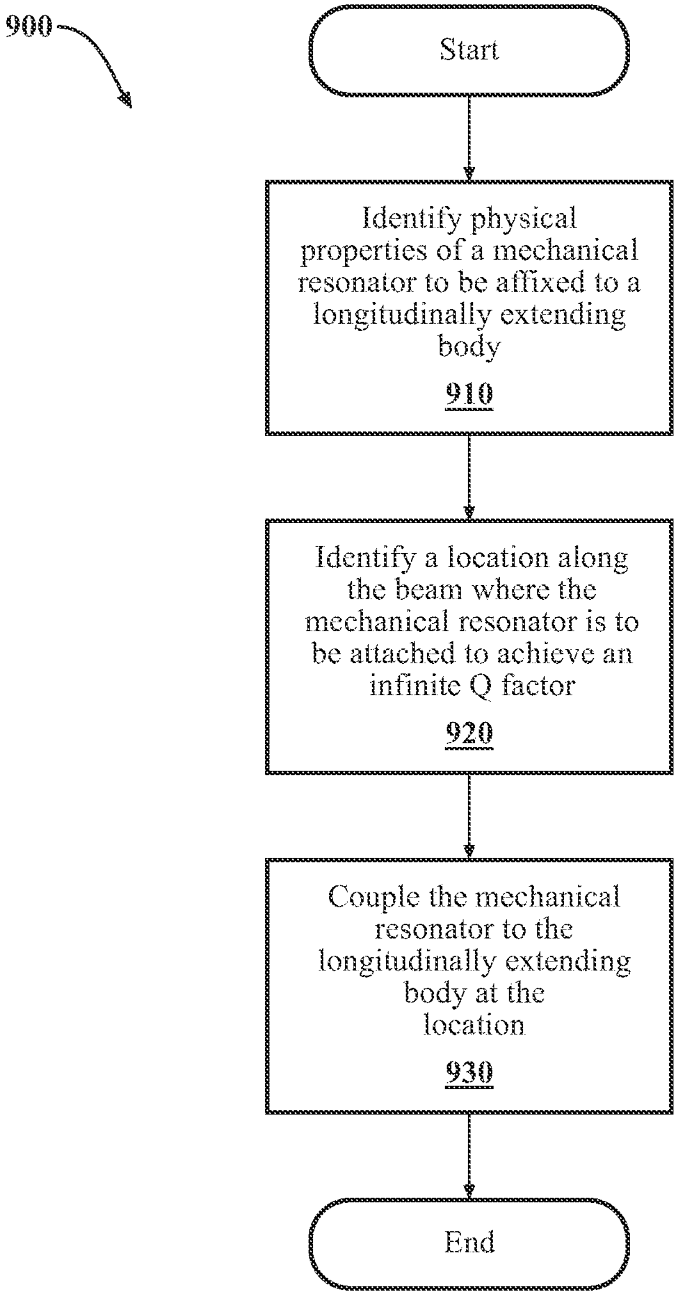
FIG. 9 illustrates one embodiment of a method that is associated with forming a an embedded state system with an unbound Q factor.

Additional aspects of forming a resonator with an unbound Q factor will be discussed in relation to FIG. 9. FIG. 9 illustrates a flowchart of a method 900 that is associated with forming a resonator with an unbound Q factor. Method 900 will be discussed from the perspective of the embedded state system 100 of FIGS. 1 and 2. While method 900 is discussed in combination with the embedded state system 100, it should be appreciated that the method 900 is not limited to being implemented within the embedded state system 100 but is instead one example of a system that may implement the method 900.

At operation 910, physical properties of a mechanical resonator 115 to be positioned along a length dimension of a longitudinally extending body 105 are identified. That is, the mechanical resonator 115, which is to be placed on a body 105 subject to flexural waves, has physical properties that affect the absorption characteristics of the mechanical resonator 115. As such, these physical properties, which may vary based on the form of the mechanical resonator 115, are identified. For example, given a mass-spring mechanical resonator 115 as depicted in FIG. 1, the physical properties may include a mass, $m_1$, and a spring constant, $k_1$, of the mechanical resonator 115. When the mechanical resonator 115 includes a rigid mass component 230 and soft base component 225 as depicted in FIG. 2, the physical properties may include the mass, $m_1$, of the rigid mass component 230 and the physical and material properties of the soft base component 225. When the mechanical resonator 115 includes a rigid base component 335, an arm 340, and a rigid mass component 230 as depicted in FIGS. 3 and 4, the physical properties may include the masses of these components and the cross-sectional area, orientation, bending stiffness, or other properties of the arm 340. When the mechanical resonator 115 includes a channel 545 on the surface of the body 105 as depicted in FIGS. 5-8, the physical properties may include the dimensions and shape characteristics of the channel 545. As described above, the location at which the mechanical resonator 115 is ultimately placed also depends on the material properties of the body 105 to which the mechanical resonator 115 is to be attached. As such, the physical properties of the longitudinally extending body 105 may also be identified.

At step 920, a location is identified along the longitudinally extending body 105 at which the mechanical resonator 115 is to be affixed to achieve an infinite Q factor. That is, based on the physical properties of the mechanical resonator 115 and the physical properties of the body 105 itself, there exists a location at which the embedded state system 100 exhibits an unbound Q factor, despite the intrinsic damping limitations of the mechanical resonator 115. In one particular example, given a mass-spring type mechanical resonator 115 with $m_1=9.5903\times10^{-4}$ kilograms (kg) and $k_1=9.1431\times10^4$ Newtons per meter (N/m) and an aluminum body 105 having a cross-sectional area of 12.7 millimeters (mm)× 3.127 mm, a Young's Modulus of 70 gigaPascal (Gpa), a density of 2700 kg/$m^3$, and Poisson's ratio of 0.33, the calculated distance, d, is between 21 and 22 millimeters (mm) away from a second end 220 of the longitudinally extending beam. Note that different distances, d, may be determined via experimentation and simulation for the different types of mechanical resonators (as depicted in FIGS. 2-10) and for different boundary conditions of the body 105.

At step 930, the mechanical resonator 115 is coupled to the longitudinally extending body 105 at the identified location. The mechanical resonator 115 is coupled to the body 105 using any one of a number of attachment means, including adhesives press form fittings, screw-type fittings, fasteners, clamps, or any other mechanism for joining one or more separate pieces together. In the example where the mechanical resonator 115 includes a channel 545, coupling the mechanical resonator 115 to the body 105 may includes etching, or otherwise forming the channel 545 in the surface of the body 105.

As such, the present embedded state system 100 provides for the absorption of flexural waves by positioning the mechanical resonator 115 at a distance away from a second end 220 of the body 105, which is defined based on the physical properties of the mechanical resonator 115 and selected to have an infinite or unbound Q factor.

FIG. 10 illustrates an example graph 1000 of an embedded state system frequency response. Specifically, FIG. 10 depicts a calculated frequency response function (FRF) for a particular mechanical resonator (i.e., with a particular mass and spring constant) as a function of the normalized frequency and the distance, d, of the mechanical resonator 115 from the second end of the body 105. As depicted in FIG. 10, when the mechanical resonator 115 is placed near 22 millimeters away from the free end of the body 105, the frequency response of the embedded state system 100 is much larger and the bandwidth is narrower than when the mechanical resonator 115 is placed at another location. This measured response near d=22 mm corresponds to a high Q factor.

Figure 11:
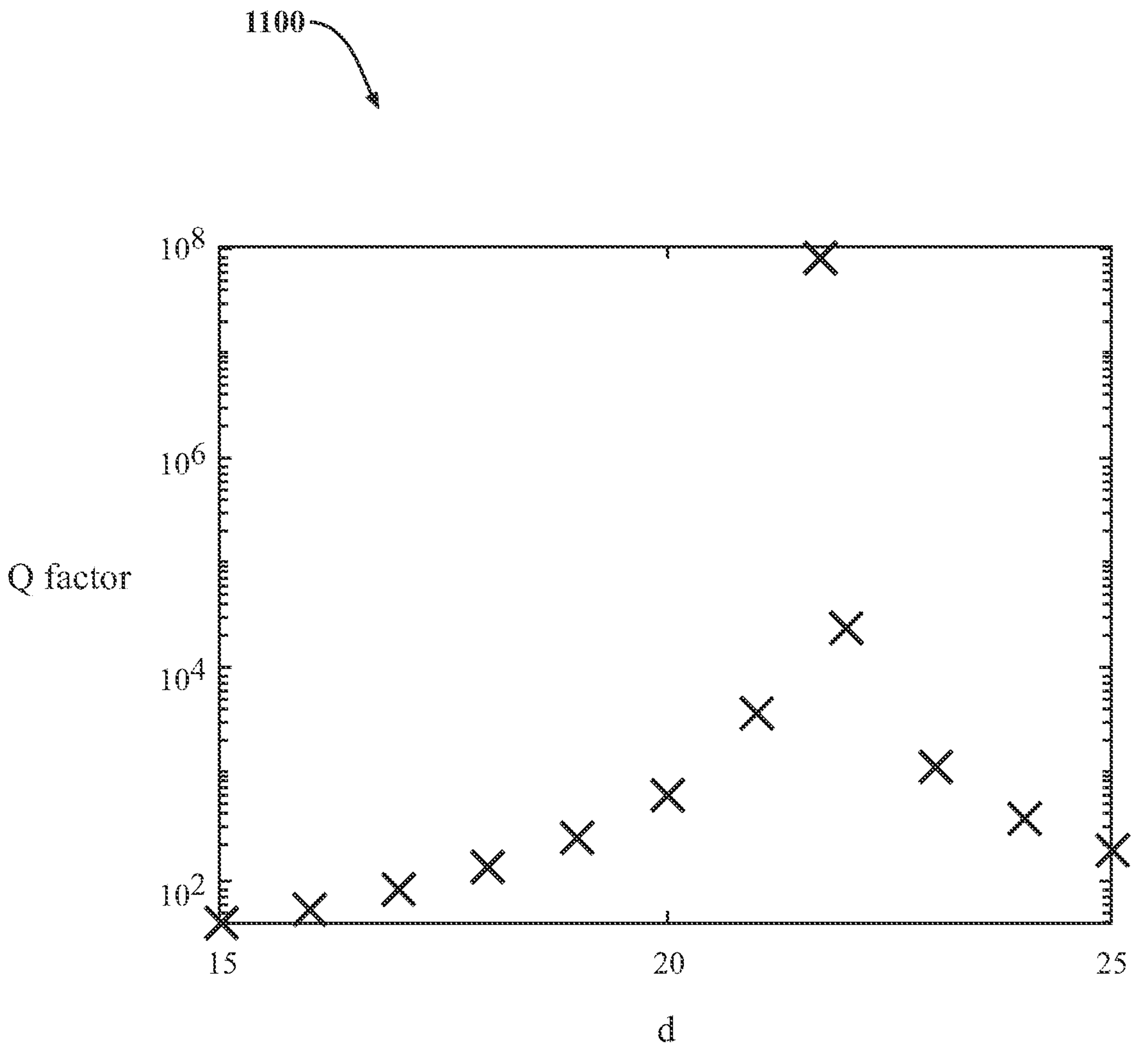
FIG. 11 illustrates an example graph of embedded state system resonator Q factor as a function of mechanical resonator location.

FIG. 11 illustrates an example graph 1100 of an embedded state system Q factor as a function of the mechanical resonator 115 location. Like FIG. 10, the example graph 1100 of FIG. 11 indicates that at a distance of 22 millimeters from the second end 220, the mechanical resonator 115 having the material and physical properties described above has a high Q factor, measured in this example to be approximately 7.6039e7. As such, the present embedded state system 100 provides for the absorption of flexural waves by positioning the mechanical resonator 115 at a distance away from a second end 220 of the body 105, which is defined based on the physical properties of the mechanical resonator 115 and selected so as to have an infinite, or unbound, Q factor.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-11, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:

a longitudinally extending body that is subject to a flexural wave, the longitudinally extending body being attached to a fixed structure at a first end; and a mechanical resonator coupled to a surface of the longitudinally extending body along a length dimension of the longitudinally extending body, the mechanical resonator being mounted at a distance, based on physical properties of the mechanical resonator, away from a second end of the longitudinally extending body, wherein a Q factor of the mechanical resonator is maximized for the physical properties of the mechanical resonator.

2. The system of claim 1, wherein the mechanical resonator comprises a channel in the surface of the longitudinally extending body.

3. The system of claim 2, wherein the channel is a C-shaped channel, an opening in the C-shaped channel faces the fixed structure at the first end of the longitudinally extending body.

4. The system of claim 2, wherein the channel is a C-shaped channel, an opening in the C-shaped channel faces away from the fixed structure at the first end of the longitudinally extending body.

5. The system of claim 2, further comprising a rigid mass component on the surface of the longitudinally extending body, the rigid mass component is disposed within an interior arc of a C-shaped channel.

6. The system of claim 1, wherein the mechanical resonator comprises parallel channels in a surface of the longitudinally extending body in a direction perpendicular to the length dimension of the longitudinally extending body.

7. The system of claim 1, wherein the mechanical resonator is located between 21 and 22 millimeters away from a free end of the longitudinally extending body.

8. The system of claim 1, wherein the mechanical resonator comprises:

a rigid mass component; and a connecting element coupled to the rigid mass component, the connecting element maintains the rigid mass component at an elevated distance from the longitudinally extending body.

9. The system of claim 8, wherein the connecting element of the mechanical resonator comprises one of:

a spring;

a soft base component; and a rigid base component and an arm extending at an angle from the rigid base component.

10. The system of claim 9, wherein the arm extends away from the rigid base component and towards the fixed structure at the first end of the longitudinally extending body.

11. The system of claim 9, wherein the arm extends away from the rigid base component and away from the fixed structure at the first end of the longitudinally extending body.

12. A system, comprising:

a longitudinally extending body that is subject to a flexural wave, the longitudinally extending body being attached to a fixed structure at a first end; and a mechanical resonator, comprising a rigid mass component, coupled to a surface of the longitudinally extending body along a length dimension of the longitudinally extending body, the mechanical resonator being mounted at a distance, based on a mass of the rigid mass component, away from a second end of the longitudinally extending body, wherein a Q factor of the mechanical resonator is maximized for the physical properties of the mechanical resonator.

13. The system of claim 12, wherein the mechanical resonator is located between 21 and 22 millimeters away from the second end of the longitudinally extending body.

14. The system of claim 13, wherein the second end is one of:

a free end;

a fixed end; and a simply-supported end.

15. The system of claim 12, further comprising a C-shaped channel in the surface of the longitudinally extending body, the rigid mass component is disposed within an interior arc of the C-shaped channel.

16. The system of claim 12, wherein the mechanical resonator comprises a connecting element connected to the rigid mass component, the connecting element maintains the rigid mass component at an elevated distance from the longitudinally extending body.

17. The system of claim 16, wherein the connecting element of the mechanical resonator comprises one of:

a spring;

a soft base component; and a rigid base component and an arm extending at an angle from the rigid base component.

18. A method, comprising:

identifying physical properties of a mechanical resonator to be positioned along a length dimension of a longitudinally extending body that is subject to a flexural wave;

identifying, based on the physical properties of the mechanical resonator, a distance away from a free end of the longitudinally extending body at which the mechanical resonator is to be affixed to maximize a Q factor of the mechanical resonator; and coupling the mechanical resonator to the longitudinally extending body at an identified distance from the free end.

19. The method of claim 18:

further comprising identifying physical properties of the longitudinally extending beam; and wherein identifying the location along the longitudinally extending body at which the mechanical resonator is to be affixed is further based on the physical properties of the longitudinally extending beam.

20. The method of claim 18, wherein coupling the mechanical resonator to the longitudinally extending body comprises forming a channel in a surface of the longitudinally extending body at the identified location.

* * * * *